MAGNETIC DOMAIN WALL LOGIC CIRCUIT

Filed Dec. 13, 1966 2 Sheets-Sheet 1

INVENTOR
H. E. D. SCOVIL
BY Herbert M. Shapiro
ATTORNEY

United States Patent Office 3,458,714

Patented July 29, 1969

3,458,714

MAGNETIC DOMAIN WALL LOGIC CIRCUIT

Henry E. D. Scovil, New Vernon, N.J., assignor to Bell Telephone Laboratories, Incorporated, Murray Hill and Berkeley Heights, N.J., a corporation of New York Filed Dec. 13, 1966, Ser. No. 601,508
Int. Cl. H03k *19/22*
U.S. Cl. 307—88 4 Claims This invention relates to magnetic logic circuits and has for its primary object to provide a simple magnetic AND circuit.

The invention is described in terms of a domain wall device. K. D. Broadbent, Patent 2,919,432, issued Dec. 29, 1959, discloses a domain wall (shift register) device. Such a device comprises a magnetic medium (a thin film or a magnetic wire) normally initialized to a first direction of magnetization. The magnetization of a portion of the medium is reversed to a second direction in response to a first (nucleation) field in excess of a first (nucleation) threshold providing a reverse magnetized domain which defines leading and trailing domain walls with adjacent initialized portions. After a reverse domain is nucleated, second (propagation) fields are generated in consecutive portions of the medium to advance the domain without nucleating additional domains. The second fields, to this end, are limited to values in excess of a second (propagation) threshold and less than the nucleation threshold. Fields of like polarity cause leading and trailing domain walls to move in opposite directions in the magnetic medium. So for a field of a first polarity the reverse domain grows; for a field of a second polarity it collapses. To move a reverse domain of stable configuration in a first direction in a magnetic medium a four-phase propagation sequence is provided.

Adjacent reverse domains are located in bit locations spaced apart in the magnetic medium by the distance traversed by a reverse domain during one four-phase propagation sequence. The portion of the medium intermediate two adjacent bit locations is called a buffer zone.

The present invention is based on the realization that if reverse domains are generated in each of adjacent buffer zones and thereafter propagation fields are generated to bring together walls bounding the intermediate bit location, those walls annihilate one another. A subsequent reversal of the polarity of the propagation fields returns to an adjacent buffer zone only a wall for which no mate was present for annihilation. A later field, collapsing domains in the buffer zones, provides a reverse domain in the intermediate bit location only if a domain was present initially in each of the adjacent buffer zones. The invention is described illustratively in terms of magnetic wire conveniently of a compensated molypermalloy as disclosed in copending application Ser. No. 458,140, now patent number 3,365,290, filed May 24, 1965 for D. H. Smith and E. M. Tolman.

The various objects and features of this invention will be understood more fully from a consideration of the following detailed description rendered in conjunction with the accompanying drawing in which.

Figures 1, 2, 4, 5:
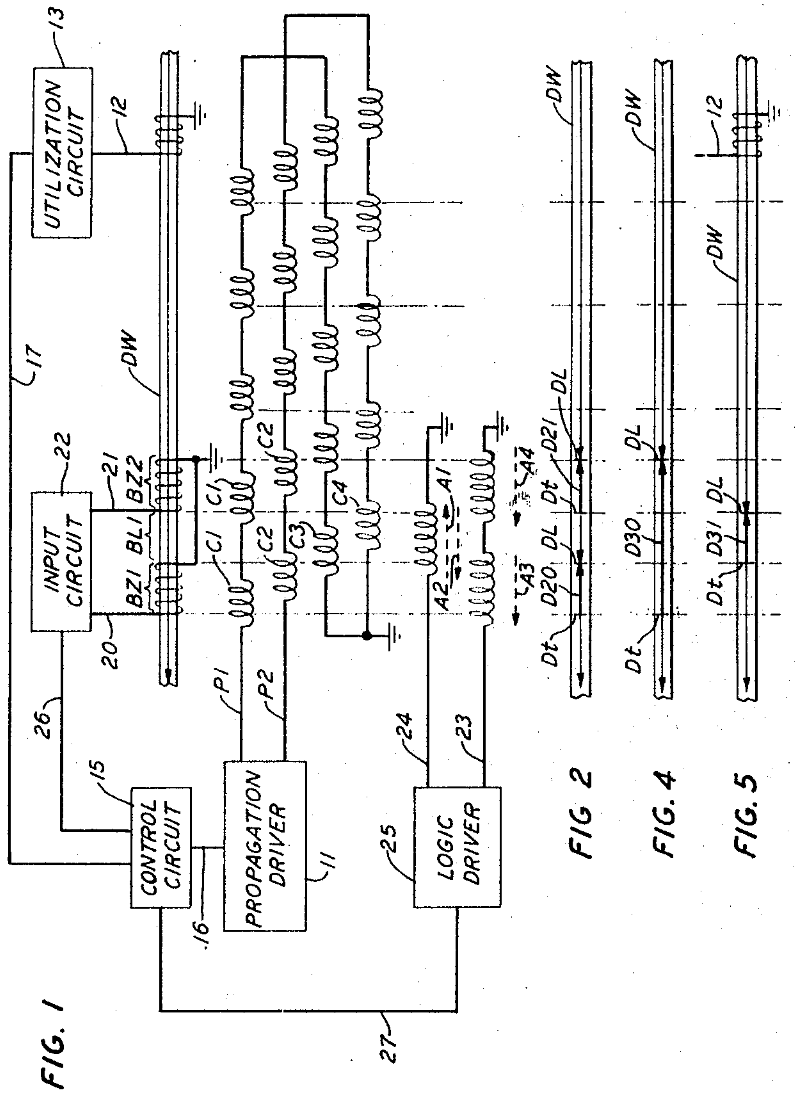
FIG. 1 is a schematic illustration of a logic circuit in accordance with this invention.
FIGS. 2 and 4 through 9 are schematic illustrations of a portion of the circuit of FIG. 1 showing the various magnetic conditions therein during operation.

FIG. 1 shows a magnetic AND circuit, in accordance with this invention, in the context of a domain wall shift register. The shift register comprises a domain wall wire DW to consecutive portions of which propagation conductors P1 and P2 are coupled in alternating fashion. The couplings between the propagation conductors and wire DW are represented by coils spaced apart from wire DW for clarity. The sense of the couplings along either conductor P1 or conductor P2 alternates as is clear from the figure. Conductors P1 and P2 are connected between a propagation driver 11 and ground.

A sense conductor 12 is coupled to an output position in wire DW shown to the right as viewed in FIG. 1. Sense conductor 12 is connected between a utilization circuit 13 and ground.

Propagation driver 11 and utilization circuit 13 are connected to a control circuit 15 via conductors 16 and 17, respectively.

Four adjacent couplings between the propagation conductors define a buffer zone and adjacent bit location. For example, coils C1, C2, C3, and C4 of FIG. 1 define a buffer zone BZ1 and a bit location BL1. Next adjacent coils C1 and C2 define an adjacent buffer zone BZ2.

First and second input conductors 20 and 21 couple buffer zones BZ1 and BZ2, respectively. The input conductors are connected between an input circuit 22 and ground.

In addition, a conductor 23 is coupled, in a like manner, to buffer zones BZ1 and BZ2, and a conductor 24 is coupled to bit location BL1. Each of conductors 23 and 24 is connected between a logic driver 25 and ground.

Input circuit 22 and logic driver 25 are connected to control circuit 15 via conductors 26 and 27, respectively.

The various drivers and circuits may be any such elements capable of operating in accordance with this invention.

The circuit of FIG. 1 operates to provide an output when pulses are present in input conductors 20 and 21 and to provide no output when a pulse is present in input conductor 20 or in input conductor 21 but not in both.

Consider the case when pulses are applied to both input conductors. The input pulses are considered of an amplitude to nucleate reverse domains in the coupled portions of wire DW. The resulting reverse domains, designated D20 and D21 in FIG. 2, are represented by arrows directed to the right as viewed. The arrows representing reverse domains are bounded by vertical lines DL and D*t* representing the leading and trailing domain walls, respectively. Initialized portions of the wire are represented by arrows directed to the left. The input pulses are shown in FIG. 3 at time *t1* as (illustratively concurrent) pulses P20 and P21.

Figure 3:
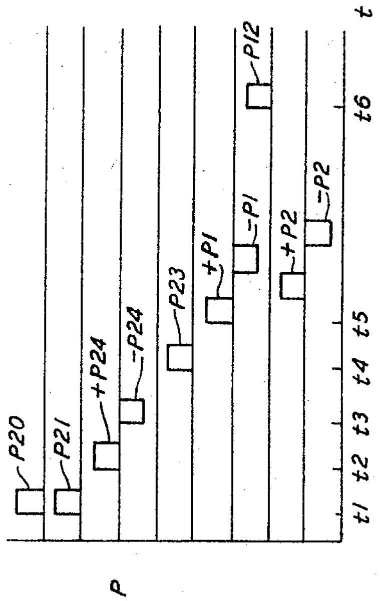
FIG. 3 is a pulse diagram of the operation of the circuit of FIG. 1.

At a time *t2* in FIG. 3, a positive pulse +P24 is applied to conductor 24 to generate a propagation field represented by the broken arrow A1 directed to the right in FIG. 1. The leading and trailing walls of domains D20 and D21, respectively, move toward one another and are annihilated. One long domain D30 remains as shown in FIG. 4. At a time *t3*, a negative pulse —P24 is similarly applied to conductor 24 generating (in bit location BL1) the opposite field as represented by the broken arrow A2 directed to the left in FIG. 1. No walls are present to be moved apart by that field.

Next, at a time *t4* in FIG. 3, a pulse is applied to conductor 23 for generating the fields represented by the broken arrows A3 and A4 shown directed to the left in FIG. 1. In response to those fields, the domain walls DL and D*t* move to the left and to the right, respectively, as viewed in FIG. 4 and, thus, the coupled portions of wire DW are initialized. The domain D31 remains as shown in FIG. 5.

A sequence of propagation pulses ±P1 and ±P2 is initiated at time *t5*. Such propagation pulses advance domain D31, in a well known manner, to the output position for inducing an output pulse P12 in conductor 12 for detection by utilization circuit 13 under the control of control circuit 15. All drive pulses are applied by means of associated drivers under the control of control circuit 15.

Figures 6, 7, 8, 9:
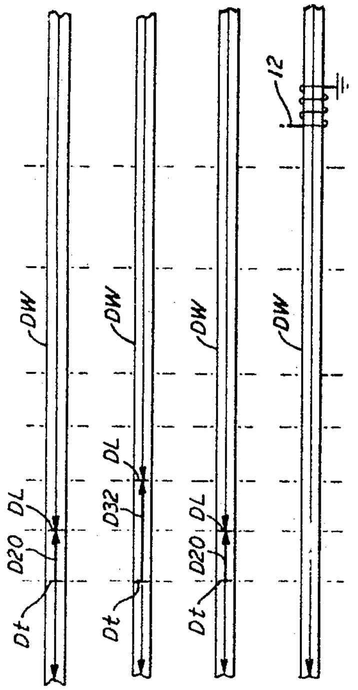

It has been shown that input pulses on both input conductors provide a reverse domain in wire DW and that that domain later provides an output pulse. Let us now consider what happens when a pulse is present on only one input conductor. For illustrative purposes, let us assume that a pulse is present on conductor 20 but not on conductor 21. In response to the input pulse P20, a reverse domain D20 is provided in wire DW as shown in FIG. 6. Of course, a domain D21, as shown in FIG. 2, is absent in the present example. The pulse +P24 on conductor 24, at time *t2* in FIG. 3, moves the leading domain wall DL to the right as shown in FIG. 7 forming a longer domain D32. The following negative pulse —P24, of course, merely returns that wall to its initial position as shown in FIG. 8. It is clear that FIG. 6 and FIG. 8 are identical. The pulse P23, shown in FIG. 3 at time *t4*, collapses the domain D20 of FIG. 8. The wire is, then, clear of reverse domains and later applied propagation pulses are not accompanied by an output pulse.

The operation is entirely analogous if a pulse is present on conductor 21 but not conductor 20.

The invention has been disclosed in terms of a parallel input. Of course this is not necessary. Series inputs are also useful for providing the domain configurations of FIG. 2 or FIG. 6. Moreover, although the invention has been described in terms of a wire implementation, it is also contemplated to employ magnetic sheets of the type described in copending applications Ser. No. 579,995 and Ser. No. 579,931, filed Sept. 16, 1966, for P. C. Michaelis, and for A. H. Bobeck, U. F. Gianola, R. C. Sherwood and W. Shockley, respectively, to this end. In cases where magnetic sheets are employed, the polarities of the propagation fields are determined in accordance with the teaching of the two last-mentioned copending applications. Although reverse domains in such sheets are bounded by a single wall, that portion of the wall in the direction of movement may be thought of as a leading wall; the opposite portion of the wall may be thought of as the trailing wall.

Logic circuits in accordance with this invention are expected to find use in magnetic wire circuits for computers where drive circuitry would be shared by many logic channels.

What has been described is considered only illustrative of the principles of this invention. Accordingly, other and different arrangements according to the principles of this invention may be devised by one skilled in the art without departing from the spirit and scope of this invention.

What is claimed is:

1. A magnetic logic circuit comprising a magnetic medium exhibiting a reverse magnetized domain having leading and trailing domain walls in response to a first field in excess of a first threshold and also exhibiting the movement of reverse domains in the presence of second fields in excess of a second threshold but less than said first threshold, means defining bit positions spaced apart by buffer zones in said medium, means responsive to first coded input signals selectively providing reverse domains in adjacent buffer zones spaced apart by a first bit position, means generating in said first bit position a second field of a first polarity for moving together any adjacent leading and trailing domain walls existing in said first bit position thus annihilating said last-mentioned walls in pairs, means generating in said first bit position a second field of a second polarity for returning to adjacent buffer zones a single one of said walls for which the other of a pair is absent, and means collapsing reverse domains in said adjacent buffer zones.

2. A magnetic logic circuit in accordance with claim 1 wherein said medium comprises a magnetic wire.

3. A magnetic logic circuit in accordance with claim 2 including means generating second fields in consecutive positions in said wire for advancing reverse domains to an output position in said wire.

4. A magnetic logic circuit in accordance with claim 3 including output means coupled to said wire at said output position for detecting the passage of domain walls thereby.

References Cited

UNITED STATES PATENTS 2,919,432 12/1959 Broadbent ---------- 340—174

BERNARD KONICK, Primary Examiner

KENNETH E. KROSIN, Assistant Examiner

U.S. Cl. X.R.

340—174